(12) United States Patent
Kuusela et al.

(10) Patent No.: US 10,045,382 B2
(45) Date of Patent: Aug. 7, 2018

(54) LINK ADAPTATION ON A LICENSE ASSISTED ACCESS CARRIER

(71) Applicant: Nokia Solutions and Networks Oy, Espoo (FI)

(72) Inventors: Markku Tapani Kuusela, Espoo (FI); Jari Petteri Lunden, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 108 days.

(21) Appl. No.: 15/054,304

(22) Filed: Feb. 26, 2016

(65) Prior Publication Data

US 2017/0251399 A1    Aug. 31, 2017

(51) Int. Cl.
| | |
|---|---|
| *H04W 74/08* | (2009.01) |
| *H04L 1/18* | (2006.01) |
| *H04L 5/00* | (2006.01) |
| *H04W 28/02* | (2009.01) |
| *H04L 1/00* | (2006.01) |
| *H04W 28/04* | (2009.01) |
| *H04L 1/20* | (2006.01) |

(52) U.S. Cl.
CPC ......... *H04W 74/085* (2013.01); *H04L 1/0021* (2013.01); *H04L 1/1822* (2013.01); *H04L 1/20* (2013.01); *H04L 5/0055* (2013.01); *H04L 5/0057* (2013.01); *H04W 28/0236* (2013.01); *H04W 28/044* (2013.01); *H04W 74/0808* (2013.01); *H04L 1/0003* (2013.01); *H04L 1/0009* (2013.01); *H04L 1/0026* (2013.01)

(58) Field of Classification Search
None
See application file for complete search history.

(56) References Cited

U.S. PATENT DOCUMENTS

| | | | | |
|---|---|---|---|---|
| 2010/0284454 | A1* | 11/2010 | Oteri ................... | H03M 13/353 375/224 |
| 2013/0308479 | A1* | 11/2013 | Schober .................... | H04L 1/20 370/252 |
| 2014/0126467 | A1* | 5/2014 | Lu ........................... | H04L 1/003 370/328 |
| 2014/0241307 | A1* | 8/2014 | Liu ...................... | H04B 7/0617 370/329 |
| 2016/0143043 | A1* | 5/2016 | Chendamarai Kannan ................. | H04L 1/0002 370/329 |
| 2016/0337072 | A1* | 11/2016 | Yang ................. | H04W 72/0413 |
| 2017/0111931 | A1* | 4/2017 | Damnjanovic ... | H04W 74/0825 |

OTHER PUBLICATIONS

NTT Docomo R1-144339, Inter-operator and Inter-RAT co-existence techniques for LAA using LTE; 2014.

(Continued)

*Primary Examiner* — Chirag Shah
*Assistant Examiner* — Srinivasa Reddivalam
(74) *Attorney, Agent, or Firm* — Harrington & Smith

(57) ABSTRACT

In accordance with the example embodiments of the invention there is at least a method and an apparatus to perform determining, by the network node, an occurrence of collisions in a communication associated with the network device of the communication network, where the determining is using a sensing threshold; and based on the determined occurrence of collisions, updating an outer-loop link adaptation offset of the communication.

18 Claims, 3 Drawing Sheets

(56) References Cited

OTHER PUBLICATIONS

Renesas Mobile Europe Ltd R4-114251, UE demodulation under colliding RS in eICIC; 2011.
Ericsson et al R4-114351, PDSCH performance for colliding/non-colliding non-MBSFN ABS; 2011.
Nokia Networks R1-154470, LAA coexistence results with different HARQ-ACK combiners; 2015.

* cited by examiner

LINK ADAPTATION ON A LICENSE ASSISTED ACCESS CARRIER

TECHNICAL FIELD

The teachings in accordance with the example embodiments of this invention relate generally to performing at least one outer-loop link adaptation offset for License-Assisted Access.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
ACK acknowledgement
BLEP block error probability
CCA clear channel assessment
CQI channel quality indicator
CSI channel state information
DTX discontinuous transmission
ECCA extended CCA
HARQ hybrid automatic repeat request
LA link adaptation
LAA license assisted access
LBT listen-before-talk
LTE long term evolution
MAC medium access control
MCS modulation and coding scheme
NACK negative acknowledgement
OLLA outer-loop link adaptation
PDCP packet data convergence protocol
PDCCH physical downlink control channel
PER packet error rate
PHY physical layer (layer 1, L1)
RLC radio link control
RRC radio resource control
SINR signal-to-interference-plus-noise ratio
TTI transmission time interval
TX transmission
TxOP transmission opportunity
UE user equipment License-Assisted Access (LAA) allowing LTE to be deployed in unlicensed spectrum is a promising approach and currently being specified in 3GPP LTE to meet the ever increasing demand for mobile data traffic. To guarantee peaceful co-existence of LAA using LTE with the incumbent systems such as WiFi, listen-before-talk (LBT) which requires the node to sense the medium before data transmission was introduced.

Listen before Talk (LBT) (or sometimes called Listen before Transmit) is a technique used whereby a radio transmitter first senses its radio environment before it starts a transmission. LBT can be used by a radio device to find a free radio channel or a resource free to operate on. For the LBT technique an LAA node compares the received wideband interference on shared medium against some pre-defined threshold value (a.k.a. sensing threshold, e.g., −72 dBm), and if the received interference is below the sensing threshold, data transmission is allowed. Hence, the utilization of LBT in LAA nodes implies that the received interference level can be significantly reduced compared to case without LBT usage.

Unfortunately collisions (=overlapping transmissions causing received interference to exceed the used sensing threshold) cannot be fully avoided even with LBT, as the ECCA counter utilized by LBT can reach zero value in the same clear channel assessment (CCA) slot for more than two LAA nodes doing sensing, implying that both LAA nodes are starting a transmission opportunity (TxOP) effectively at the same time. As the utilization of the LBT reduces the received interference at the UE significantly, the impact of possible collision is very dramatic to the received signal quality, e.g., SINR/CSI can easily drop 10-20 dB. As the duration of the collisions is rather short (Cat4 LBT limits the TxOP duration typically to 2-10 ms), collisions cause short and high interference peaks to a received signal quality.

LTE utilizes outer-loop link adaptation (OLLA) algorithm to compensate the impact of imperfections in UE's channel quality indicator (CQI) reports for example. OLLA compensated CQI values are used at eNB for link adaptation (LA) and packet scheduling (PS). It is well known that outer-loop link adaptation performs very well in slowly varying channel conditions, but when received interference fluctuates rapidly performance of the OLLA may be significantly deteriorated. This can be because the OLLA algorithm is not able to provide adaptation fast enough, and the BLEP target towards which OLLA tries to converge cannot be met. Therefore, in LAA using LTE the outer-loop link adaptation (OLLA) can be biased due to collisions of transmissions from other LAA cells (or e.g., WLAN).

Some of the example embodiments of the invention provide at least a novel method and apparatus to, for example, improve an accuracy of OLLA, such as in a case of LAA.

SUMMARY

In an example aspect of the invention, there is a method comprising determining, by a network node, an occurrence of collisions in a communication associated with a network device of the communication network, where the determining is using a sensing threshold; and based on the determined occurrence of collisions, updating an outer-loop link adaptation offset of the communication.

In an example aspect of the invention, there is a non-transitory computer readable medium encoded with a computer program executed by a processor to perform actions comprising: determining, with a network node, an occurrence of collisions in a communication associated with a network device of a communication network, where the determining is using a sensing threshold; and based on the determined occurrence of collisions, updating an outer-loop link adaptation offset of the communication.

In another example aspect of the invention, there is an apparatus comprising: apparatus comprising: at least one processor; and at least one memory including computer program code, where the at least one memory and the computer program code are configured, with the at least one processor, to cause the apparatus to at least: determine an occurrence of collisions in a communication associated with a network device of a communication network, where the determining is using a sensing threshold; and based on the determined occurrence of collisions, update an outer-loop link adaptation offset of the communication.

In still another example aspect of the invention, there is an apparatus comprising means for determining, with a network node, an occurrence of collisions in a communication associated with a network device of the communication network, where the determining is using a sensing threshold; and means, based on the determined occurrence of collisions, for updating an outer-loop link adaptation offset of the communication.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 1:
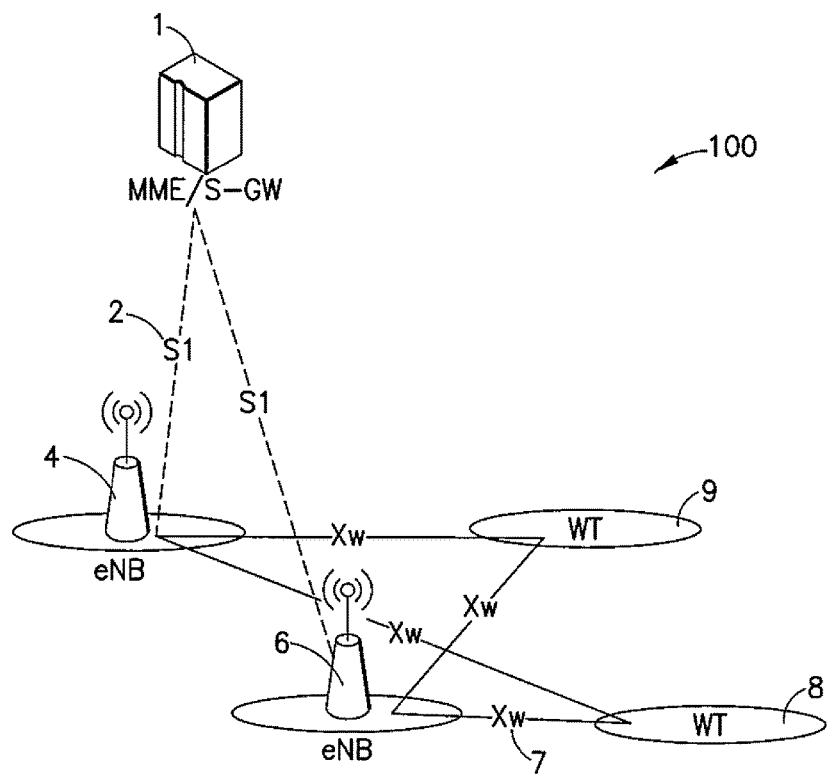
FIG. 1 shows an example of overall architecture of an E-UTRAN system.

In some example embodiments of the invention, there is a method and apparatus to perform an OLLA offset such that a negative impact caused by colliding LAA transmissions can be reduced.

In LAA using LTE, for example, the outer-loop link adaptation (OLLA) can be biased badly by the collisions of transmissions from other LAA cells or a WLAN. For example, if 10% of the transmissions suffer a collision (and most likely fail), the OLLA offset can become too pessimistic. This is the case for at least the reason that typically a downward adjustment step after an error is larger than the step up after successful transmission. In a worst case the collision probability is higher than the BLEP target set for OLLA. In this case the OLLA will converge towards a value where the transmission is successful even when there is a collision, which is undesirable as some of the capacity offered by the communication channel will be unused due to using too robust MCS.

The link adaptation (LA) process is a core feature of 3GPP long-term evolution (LTE) and LTE-advanced (LTE-A) for downlink signaling. In link adaptation procedures a receiver suggests to the base station (BS), through a channel quality indicator (CQI), an appropriate modulation and coding scheme (MCS) according to current channel conditions. The CQI plays a key role in the link adaptation process. The CQI is sent by UE to e-NodeB describing the current downlink channel quality of the UE. It is measured from the reference symbols transmitted by eNBs. When the UE sends its CQI reports to the eNB a scheduler of the eNB can perform scheduling assignments according to the received information. A purpose of the eNB link adaptation units is to modify the received CQI information and thus allocated MCS so that a certain BLER target is met.

In addition to the processes as described above an outer loop link adaptation (OLLA) algorithm is performed to modify mappings from signal-to-noise ratio (SNR) to CQI. A main purpose of outer loop link adaptation is to keep a packet error rate (PER) at a given level by adjusting the adaptation thresholds dynamically, although the difference between the thresholds can be kept the same. This can be implemented by assigning the mobile station a specific OLLA offset, which is used to shift the estimated SINR value. However, if UE has reported CSI measurement that has been performed when there is no colliding/overlapping transmission from another cell (which should be the typical case for LAA), and the eNB then does the link adaptation (modulation coding scheme (MCS) selection) based on that information, there is a problem if there is a collision and an OLLA offset is updated. This is for at least the reason that it can lead to inaccurate link adaptation for the UE as the OLLA offset will be between the correct one for a collision case and a non-collision case. Also it is noted that overlapping transmissions not regarded as collisions (e.g. received interference from the node doing overlapping transmission is falling below the sensing threshold) can cause relatively high interference peaks to received signal quality, especially if the received interference from the node doing overlapping transmission is close to the used sensing threshold. These overlapping transmissions can include overlapping transmission which are allowed by the LBT (i.e., received total interference below the sensing threshold) but which are causing relatively high interference peaks to UEs. These operations may clearly be suboptimal.

In the context of an example embodiment of the invention the definition of the collision is extended so that it includes also overlapping transmission which are allowed by the LBT (e.g. received total interference below the sensing threshold) but which are causing relatively high interference peaks towards UEs having parallel transmissions.

Some embodiments of the invention provide at least a method and apparatus that may improve an accuracy of OLLA such as in the case of LAA. In some embodiments of the invention, if the eNB did the link adaptation assuming a clean channel (no collision) and due to a collision such as identified by the LAA node based on CSI feedback from the UE and/or by its interference measurements indicating higher interference than some predefined threshold indicating collisions, where the predefined threshold can be lower than the actual sensing threshold) the transmission is not successful (NACK from UE is received), and the OLLA offset is not updated. Furthermore, a secondary offset may be used in link adaptation for those transmissions where LAA node predicts (e.g. by comparing the interference measurement to a predefined threshold indicating collision, where this predefined threshold can be lower than the actual sensing threshold) that there will be a collision. This secondary offset is updated based on HARQ feedback (received from UE) from those transmissions which utilized this secondary offset in the link adaptation on the condition that the UE's feedback (CSI, HARQ feedback) from those transmissions indicate collision.

FIG. 1 shows an example of overall architecture of an E-UTRAN system 100 which can benefit from some embodiments of the invention. FIG. 1 illustrates an overall architecture for an LTE/WLAN aggregation (LWA) non-collocated scenario and LWA in an E-UTRAN system. It is noted that the example embodiments of the invention as described herein are non-limiting, and the given systems described herein are used primarily for example purposes. Some example embodiments of the invention could be used in a system operating fully on unlicensed band as well, or on a licensed spectrum, for example a system applying LBT within the system. There may be also other situations where the system has unpredictable high interference spikes which can affect the OLLA performance. If those are detected, some of the example embodiments can be applied for benefit as described herein.

As shown in FIG. 1, the Xw interface is defined between each of the eNB 4 and the eNB 6 and the WLAN termination (WT) points WT 0 and WT 8, and the WT points each terminate an Xw interface. Thus, the eNBs 4 and 6 are connected to WT points via Xw interfaces 7, and the eNBs 4 and 6 each connect to the MME/S-GW (e.g., core network) via the S1 interface 2.

E-UTRAN supports the LWA operation whereby a UE in RRC_CONNECTED is configured by the eNB to utilize radio resources of LTE and WLAN. For example in LTE networks, generally coverage is ubiquitous whereas a deployment of Wi-Fi may be using hotspots. An LTE connection is maintained when a user equipment moves in and out of a Wi-Fi hotspot coverage area. As this happens the disconnection and reconnection of a Wi-Fi connection may be transparent to the user equipment.

PDCP-level aggregation may be supported with legacy Wi-Fi Access Points (Aps) together with non-collocated LTE eNBs provided a link exists between them for an Access Point (AP) to report information such as loading and a modulation coding scheme (MCS) to an eNB for example.

The E-UTRAN system includes eNBs, providing an E-UTRAN user plane (e.g., using a packet data convergence protocol (PDCP), radio link control (RLC), medium access control (MAC), and/or a physical layer (PHY)) and/or control plane (RRC) protocol terminations towards the UE (not shown in FIG. 1). The eNBs are interconnected with each other by means of an X2 interface. The eNBs are also connected by means of a S1 interface to an EPC (Enhanced Packet Core), such as to a MME (Mobility Management Entity) 1 by means of a S1 MME interface and to a Serving Gateway (S-GW) by means of a S1 interface 2. The S1 interface 2 supports a many-to-many relationship between MMEs/S-GW and eNBs.

Figure 2:
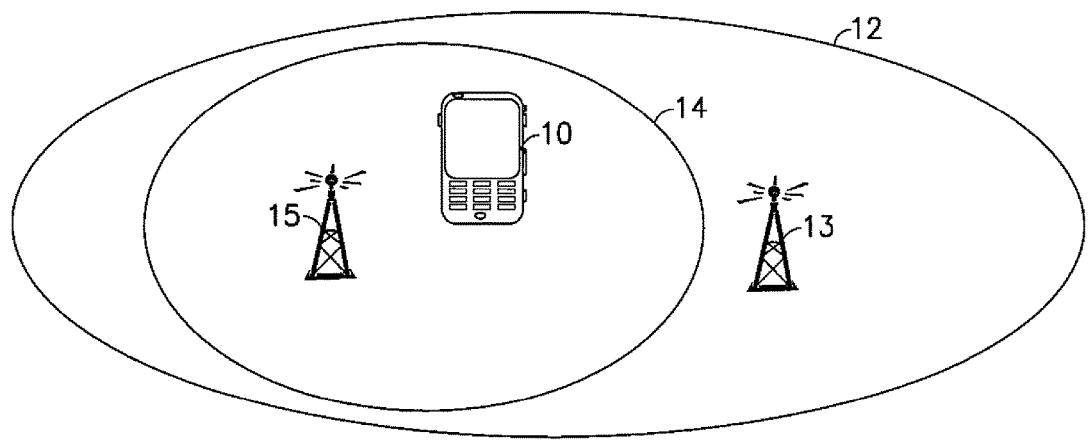
FIG. 2 shows a diagram illustrating an example of a User Equipment (UE) in partially overlapping cells.

Referring also to FIG. 2, a user equipment (UE 10) can be connected to more than one cell at a same time. In this example the UE 10 is connected to a first cell 12 having a base station 13 (such as an eNB for example) and a second cell 14 having a base station 15 (such as an eNB or WiFi Access Point for example). The two cells 12, 14 are, thus, at least partially overlapping. In one embodiment, the first cell can operate on a licensed band and the second one can operate on an unlicensed band. For simplicity, there are just two cells depicted in the scenario shown in FIG. 2. In other alternate examples any number of cells operating on licensed and/or unlicensed band(s) can be provided to work together for a suitable Carrier Aggregation (CA).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaining devices having wireless communication capabilities, music storage and playback appliances having wireless communication capabilities, Internet appliances permitting wireless Internet access and browsing, as well as portable units or terminals that incorporate combinations of such functions.

Some embodiments of the invention may be practiced to a benefit of at least the devices of the communication network configurations of FIGS. 1 and 2 as discussed above. However, as noted above, the LAA example as in FIGS. 1 and 2 is non-limiting, and the given systems described herein are used only for example.

Figure 3:
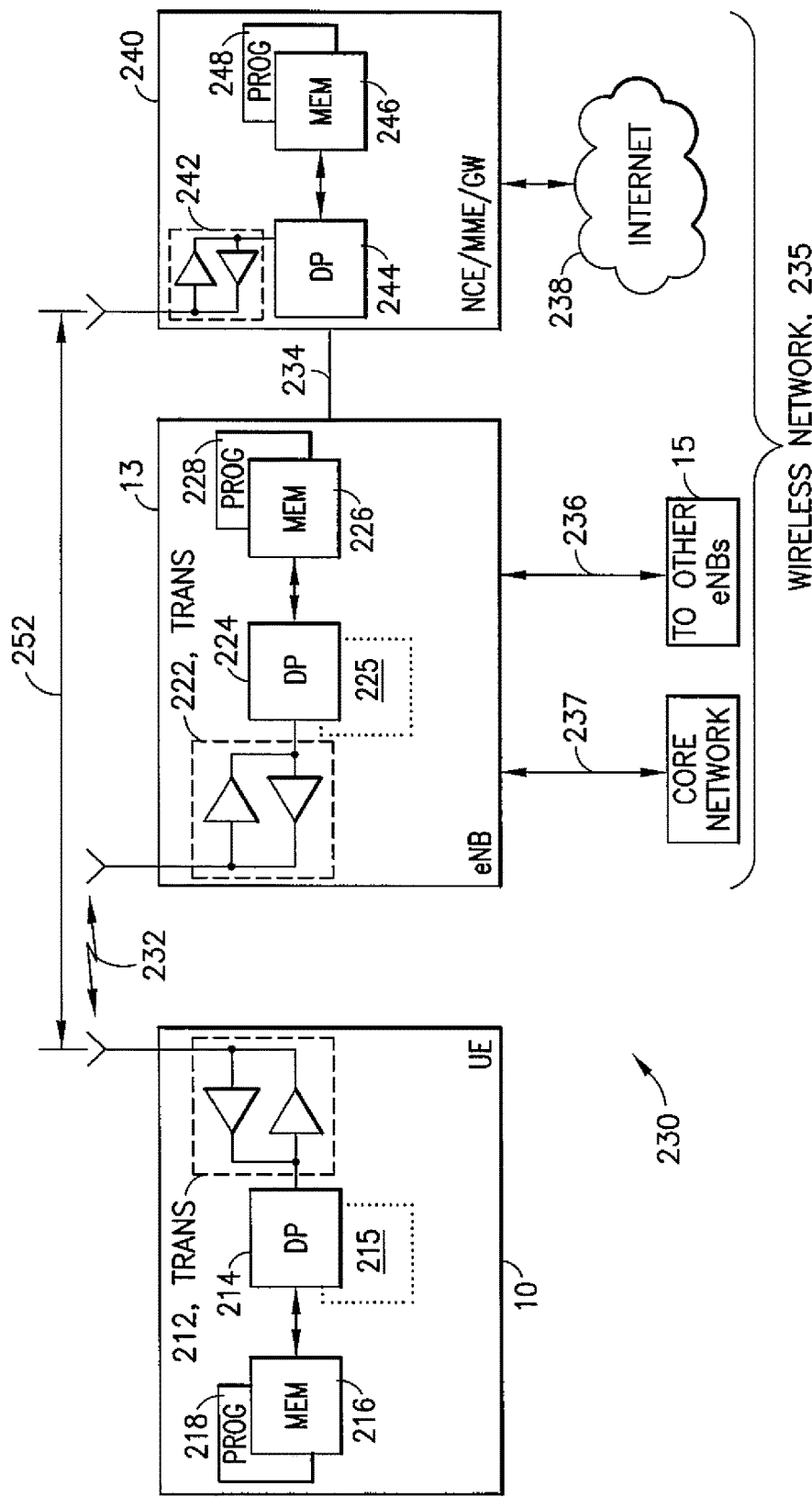
FIG. 3 shows a diagram illustrating some components of a wireless system as shown in FIGS. 1 and 2.

Before describing some embodiments of the invention in further detail reference is now made to FIG. 3. FIG. 3 illustrates a simplified block diagram illustrating some components of the wireless system, such as in the communication systems as shown in FIG. 1 and/or FIG. 2. Referring also to FIG. 3, in the wireless system 230 a wireless network 235 is adapted for communication over a wireless link 232 with an apparatus, such as a mobile communication device which may be referred to as a UE 10, via a network access node, such as a Node B (base station), and more specifically an eNB 13 such as shown in FIG. 2. The network 235 includes a network control element (NCE) 240 that can include MME/S-GW functionality, and which provides connectivity with a network, such as a telephone network and/or a data communications network (e.g., the internet 238). The NCE 240 can include a WLAN access point which can operate in accordance with some example embodiments of the invention.

The UE 10 includes a controller, such as a computer or a data processor (DP) 214, a computer-readable memory medium embodied as a memory (MEM) 216 that stores a program of computer instructions (FROG) 218, and a suitable wireless interface, such as radio frequency (RF) transceiver 212, for bidirectional wireless communications with the eNB 13 and possibly the NCE 240 via one or more antennas using the data paths 232 and 252, respectively. The PROG 218 can include computer instructions that, when executed by a processor, such as the DP 214, the UE operates in accordance with the some example embodiments of the invention.

The eNB 13 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 10 via one or more antennas. The eNB 13 is coupled via a data/control path 234 to the NCE 240. The path 234 can be implemented as an interface, such as an S1 interface. The eNB 13 can also be coupled to another eNB via data/control path 236, which can be implemented as an interface X2. In addition, the eNB 13 can be connected to a core network via a communication path 237. In accordance with an example embodiment the communication path 237 may be a wired and/or wireless communication path.

The NCE 240 includes a controller, such as a computer or a data processor (DP) 244, a computer-readable memory medium embodied as a memory (MEM) 246 that stores a program of computer instructions (PROG) 248 and possibly a suitable wireless interface, such as radio frequency (RF) transceiver 242, for bidirectional wireless communications with the UE 10 and the eNB 13 via path 234 and/or one or more antennas using a data path such as for example the data path 252.

At least one of the PROGs 218, 228 and 248 is assumed to include program instructions that, when executed by the associated DP, enable the device (or a part of the device) to operate in accordance with some embodiments of this invention, as will be discussed below in greater detail. That is, various example embodiments of this invention may be implemented at least in part by computer software executable by the DP 214 of the UE 10; by the DP 224 of the eNB 13; and/or by the DP 244 of the NCE 240, or by hardware, or by a combination of software and hardware (and firmware). Base station 15 may have the same type of components as the other base station(s) 13.

In some embodiments of the invention, the UE 10 and the eNB 13 may also include dedicated processors, for example Control module 215 and a corresponding Control module 225. Control module 215 and Control module 225 can be constructed so as to operate to perform operations as in accordance with various example embodiments in accordance with this invention. In accordance with an example embodiment of the invention at least the Control modules 215 and 225 as shown in FIG. 3 are configurable to perform at least the OLLA offset update operations in accordance with the example embodiments.

One or more computer readable MEMs 216, 226 and 246 can be of any type suitable to the local technical environment and can be implemented using any suitable data storage technology, such as semiconductor based memory devices, flash memory, magnetic memory devices and systems, optical memory devices and systems, fixed memory and removable memory. One or more DPs 214, 224 and 244 can be of any type suitable to the local technical environment, and can include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and can be implemented using any suitable communication technology such as individual transmitters, receivers, transceivers or a combination of such components.

In accordance with an example embodiment of the invention, an apparatus maintains two different OLLA offsets for each UE. In the simplest form (Alternative 1), OLLA offsets are defined as follows:

Offset_w_collision_bias: This offset is to be used in scheduling (e.g. in link adaptation and packet scheduling) for those subframes expected to have collision;

Offset_wo_collision_bias: This offset is to be used in scheduling for those subframes which are not expected to have collision.

In accordance with an example embodiment of the invention, alternative solution (Alternative 2) the OLLA offsets are defined as follows:

Offset_w_collision_bias: This offset is to be used in scheduling for those subframes expected to have collision and where UE's CSI measurements to be used in scheduling for the given subframe do not contain collision impact;

Offset_wo_collision_bias: This offset is to be used in scheduling for those subframes having no bias caused by collision between UE's CSI measurements to be used in scheduling for the given subframe and the expected "collision state" (collision/no collision) of the given subframe.

In an example embodiment herein described as alternative 1, an apparatus (e.g. licensed node or LAA node) selects proper OLLA offset to be used in scheduling based on sensing measurements done a priori to the scheduling which give indication whether the interference level in the medium is below the predefined threshold X (which can be different from a used sensing threshold). The threshold X can be equal to the sensing threshold (or same parameter could be used here), or it can be lower than the sensing threshold so that in some cases also the transmissions below the sensing threshold can be considered colliding as they can still contribute substantially to the interference In an example embodiment herein described as alternative 2, an apparatus (e.g., LAA Node) selects OLLA offsets to be used in the scheduling of the given subframe according to the following logic:

If sensing measurements done a priori to the scheduling indicate that the interference level is below the predefined threshold X (can be different from the used sensing threshold), then always use OLLA offset Offset_wo_collision_bias.

If sensing measurements done a priori to the scheduling indicate that the interference level is above the predefined threshold X (can be different from the used sensing threshold), then the OLLA offset selection depends on the UE's CSI measurements as follows: If UE's CSI measurements to be used in the scheduling of the given subframe do contain collision impact, use OLLA offset Offset_wo_collision_bias. Otherwise use OLLA offset Offset_w_collision_bias.

It is noted that any order of the example embodiments of the invention as described herein are non-limiting. In accordance with the example embodiments the operations as described herein can be performed in any usable order. For example an order the alternative embodiments which may be preferable can be as below (e.g., highest priority first).

In one example (called Alternative 0), only one OLLA offset is used. In this example, the OLLA offset can be determined in the following way:

a. An apparatus (e.g. LAA Node) receives ACK/NACK feedback from UE (REMARK: as in normal operation, only HARQ feedback of $1^{st}$ transmission may be taken into account when updating OLLA);

b. The LAA Node determines whether the ACK/NACK feedback corresponds to colliding transmission or not;

c. If the LAA Node determines that received HARQ feedback corresponded to a scheduled TTI which experienced collision, it does not update the OLLA offset. Otherwise, the OLLA offset is updated;

d. Same OLLA offset may be used for all transmissions.

In another example (called Alternative 1), two OLLA offset is used and the OLLA offsets can be determined, for example, as follows:

a. Like (a) in Alternative 0;

b. If LAA Node decides that received HARQ feedback corresponded to scheduled TTI which experienced collision, the first offset (e.g. called Offset_w_collision_bias) is updated on the condition that the first offset was used in the link adaptation of the given scheduled TTI. Otherwise, if the LAA Node decides that received HARQ feedback corresponded to scheduled TTI which did not experience collision, the second offset (e.g. called Offset_wo_collision_bias) is updated on the condition that the second offset was used in the link adaptation of the given scheduled TTI.;

c. Before doing link adaptation (LA) or scheduling for the next scheduled TTI, LAA Node decides which OLLA offset should be used (to compensate UE reported CQI values in LA/scheduling) according to the most-up-to-date interference measurement value (Y_int). If the value of the Y_int is greater than X (can be lower than the actual sensing threshold), then use the offset Offset_w_collision_bias. Otherwise, use the offset Offset_wo_collision_bias.

It is noted that the names or labels associated with the offsets or any other values as described herein are non-limiting to the example embodiments of the invention. The names or labels associated with these offsets or values as described herein are only for example purposes, and these offsets may be referred to using any name or label.

It is noted that if the interference measurement by the apparatus (e.g. access point, LAA Node etc.) cannot be updated separately for each TTI during TxOP (TXOP duration: 2-10 TTIs), then the OLLA selection can be done by using interference measurement done just before starting the TXOP and hence the OLLA selection stays the same for all TTIs over the whole TXOP duration. This means that collisions occurring during TXOP can't be captured to OLLA selection (if based on interference measurement that is not done during the TXOP) and it may be better to use Alternative 0 in this case.

Further, in accordance with some example embodiments, an LAA node can decide whether the ACK/NACK feedback corresponds to colliding transmission (valid for some alternatives) as follows:
1. Before starting to transmit next TTI, LAA Node should store information about the received interference from other LAA Nodes and/or WiFi APs on that given time to a buffer. In the case LAA node is not able to measure the interference during the TxOP, then all TTIs of the TxOP (e.g. 2-10 TTIs) are sharing same interference measurement value which is the interference measurement value measured just before the TxOP.
2. By comparing the latest (or most up-to-date) interference measurement information to the threshold X (e.g. the value of X can be less than or equal to the actual sensing threshold) LAA node would get indication that whether or not next scheduled TTI is expected to have collision (e.g., whether interference_measurement is greater than X) or not. As the interference measurements done by LAA Node are just indicative for the interference situation experienced by the scheduled UEs, and the interference measurements are done a priori to the transmission, it is reasonable to take also other UE specific measurements into account when deciding whether the HARQ feedback was for colliding transmission or not (see next step).
3. Assuming that the CSI information from the TTI which HARQ feedback are being analyzed is available: LAA Node may separate whether the UE CSI measurement indicates clean channel (no collision) or (high) interference (possible collision) e.g. by comparing UE CSI measurement against some threshold value, which can be derived/maintained by eNodeB by monitoring the CSI values UE has reported in history (proper filtering may be needed). Also sensing measurements from the history can be used to aid in the separation of UE CSI measurements between colliding and non-colliding measurements.

In some embodiments of the invention, an apparatus (e.g. LAA Node) may separate whether the UE CSI measurement indicates clean channel (no collision) or (high) interference (possible collision) e.g. by comparing UE CSI measurement against some threshold value. In some embodiments of the invention the threshold value may be derived and/or maintained by an eNB by monitoring the CSI values UE has reported in history (proper filtering may be needed). Also sensing measurements from the history can be used to aid in the separation of UE CSI measurements between colliding and non-colliding measurements. In accordance with some example embodiments, an apparatus' (e.g. eNB's) sensing history (e.g., measuring received power value(s) on the channel to determine whether it is in use by someone else) can be used for classifying the UE's reported CSI. If interference is measured in the recently (e.g. within 10 ms or so, depending on the length of the TxOP), reported CSI samples can be considered colliding measurements. In accordance with an example embodiment for the filtering can comprise the eNB storing values reported by the UE and splitting them into two groups: CSI during collision and CSI when there is no collision. Samples within these two groups could be averaged. Alternatively, if the collision rate is small (e.g. 10-20%), the eNB could just average UEs CSI measurements and determine based on the difference between received CSI report and average CSI whether the measurement was during a collision or not. (If CSI is above or close to the avg. then likely there was no collision. If CSI is significantly below avg. then a collision likely occurred.)

Further in accordance with an example embodiment an eNB may use HARQ feedback for determining whether it should be considered that a collision occurred during the TXOP or not. If the HARQ error rate (NACKs and DTX e.g., because the UE failed to even receive PDCCH and/or didn't send any feedback) is significantly higher than the target level then considering all the transmissions during the TXOP to all the UEs the eNB can identify whether collisions are occurring for the TXOP and take this into account when selecting which OLLA offset (if any) should be updated.

In some embodiments of the invention, when doing the scheduling the apparatus can store the information on the used OLLA offset type for UEs and for HARQ processes. HARQ is a combination of high-rate forward error-correcting coding and ARQ error-control. In standard ARQ, redundant bits are added to data to be transmitted using an error-detecting code such as a cyclic redundancy check (CRC). Receivers detecting a corrupted message will request a new message from the sender.

In accordance with some example embodiments, the look-up table containing information on the last used OLLA offset type for each HARQ process index can be then used to decide which OLLA offset should be updated when receiving ACK/NACK from given HARQ process. In accordance with some example embodiments the following exceptions may be applied for Alternative 2: OLLA offset update is skipped if in the scheduling of initial Tx of given HARQ process LAA Node selects OLLA offset Offset_wo_collision_bias in case of either a) sensing measurements done a priori to the scheduling indicate that the interference level is below the predefined threshold X and UE's CSI measurements to be used in the scheduling of the given subframe do contain collision impact, or b) sensing measurements done a priori to the scheduling indicate that the interference level is above the predefined threshold X and UE's CSI measurements to be used in the scheduling of the given subframe do contain collision impact. Remark: OLLA offset update is always skipped if LAA Node is able to determine based on UE's feedback that the collision prediction made by LAA Node (by comparing the interference measurements to predefined offset X) for the scheduled TTI which HARQ feedback is being analyzed, is contradicting with the collision indication obtained from the UE's feedback for the given scheduled TTI (e.g. CSI, HARQ).

In some embodiments of the invention, if the two OLLA offsets do not differ much for Alternatives 1 and/or 2, the eNB can update both offset simultaneously, or even stop using separate offsets if link performance is the same with and without collision. This can be in the case the interference from collisions is not too strong, for example.

It is noted that in accordance with an example embodiment one alternative solution would use just a single OLLA offset and update that only when there was no collision during transmission. This would mean that some feedback is ignored by OLLA and doesn't affect future LA decisions. The reasoning here is that if the LA is done assuming no collision, it is not sensible to update the OLLA offset if there actually was a collision in the end—error would not really give information of the needed adjustment to future LA decisions. Further motivation here is that most of the throughput comes from transmissions without collision on a rather clean channel and the system should optimize for those, not transmission that suffer from collision.

One more straightforward option is the Alternative 1 as described above.

OLLA selection and update mechanisms for all alternatives are described in detail herein.

In some embodiments of the invention, an additional sensing threshold X can be used by LAA Node in those sensing measurements targeting to aid the OLLA offset selection. By setting threshold X to have even lower value than the actual sensing threshold (e.g. −72 dBm for LAA), it can be guaranteed that the offset Offset_wo_collision_bias is not biased due to overlapping TxOPs having interference being slightly below the actual sensing threshold. This can increase the probability that optimal MCS is used in those TTIs having very low received interference, which will improve the system performance.

In some embodiments of the invention, the value for X can be set for example based on the interference or signal quality measurements by the eNB. For instance, if it is observed that the transmissions fail on average more often than the BLER target set for LA when interference is above −76 dBm, that value could be used here.

In some embodiments the eNB can determine whether there will be a collision based on measuring the previous TTI(s). For example, if there is a collision, the eNB can assume that it will continue in next TTI as the other transmitter will likely continue for a while (as long as is allowed by its TxOp). Sometimes this assumption is not correct (could be e.g. 20% of the time) and then the invented method for updating the OLLA offset is needed such as to avoid the OLLA drifting to an incorrect value trying to compensate for errors that it should not and cannot (link adaptation is not incorrect as such, but it is simply done based on wrong guess of whether there is a colliding transmission or not). As an example the determining can could be based on a measurement of interference power of a previous TTI (or several TTIs averaged) and a comparison of this to a threshold level. Received power above threshold would indicate that the channel was used by someone else nearby, so a collision could be expected.

Some embodiments of the invention provides, for example, improved performance (especially at cell edge,), as the link adaptation tracks the UE's link quality more accurately. Further, an additional benefit in terms of improved link adaptation accuracy and thus improved performance can come from the fact that collisions (including overlapping TxOPs causing interference just below the sensing threshold level) do not impact an OLLA offset that is used in the subframes that do not have exceeding levels of interference.

Figure 4:
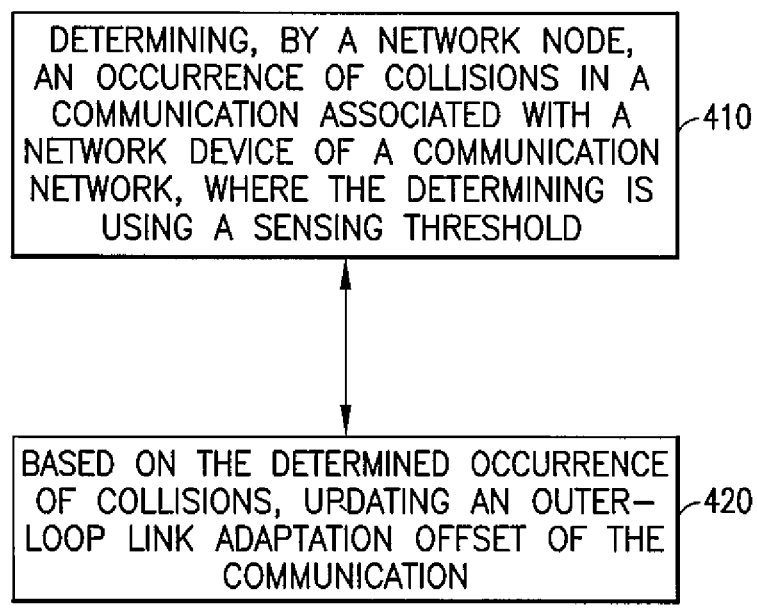
FIG. 4 is a block diagram illustrating a method in accordance with an example embodiment of the invention.

FIG. 4 illustrates a method accordance with an embodiment of the invention which may be performed by a network node such as, but not limited to an eNB 13 and/or the NCE 240 as shown in FIG. 3. As shown in step 410 of FIG. 4, there is determining, by the network node, an occurrence of collisions in a communication associated with the network device of the communication network, where the determining is using a sensing threshold. And at step 420 of FIG. 4 there is based on the determined occurrence of collisions, updating an outer-loop link adaptation offset of the communication.

In accordance with the example embodiments of the invention as described in the paragraph above, the determining the occurrence of collisions is based on a comparing the sensing threshold to information regarding at least one of an interference measurement, an error rate determined based on acknowledgements or a lack thereof from the network device, a hybrid automatic repeat request, and a received indication from the network device, wherein the received indication comprises at least one of channel state information and a channel quality indicator from the network device.

In accordance with the example embodiments of the invention as described in the paragraphs above, the determining comprises: storing in a buffer information regarding the at least one of an interference measurement, an error rate of a received acknowledgement from the network device, a hybrid automatic repeat request, and a received indication; and comparing the buffered information to the sensing threshold, wherein the comparing is using the buffer information corresponding to a transmission time interval associated with the at least one of an interference measurement, the error rate of the received acknowledgement from the network device, and the received indication.

In accordance with the example embodiments of the invention as described in the paragraphs above, the outer-loop link adaptation offset for updating is selected from a look up table of at least two offsets stored in the network node, wherein the look-up table comprises information on a last used outer-loop link adaptation offset by the network device for each hybrid automatic repeat request utilized by the network device.

In accordance with the example embodiments of the invention as described in the paragraphs above, for a case that it is determined that there is an occurrence of collisions during a transmission time interval of the communication, the updating the outer-loop link adaptation offset of the communication comprises: determining if the outer-loop link adaptation offset of the communication is using an offset with collision bias; and one of: for a case it is determined that the outer-loop link adaptation offset of the communication is using an offset with collision bias, then the updating comprises updating the outer-loop link adaptation offset of the communication with an offset with collision bias, else not updating the outer-loop link adaptation offset.

In accordance with the example embodiments of the invention as described in the paragraphs above, for a case that it is determined that there is not an occurrence of collisions during a transmission time interval of the communication, the updating the outer-loop link adaptation offset of the communication comprises: determining if the outer-loop link adaptation offset of the communication is using an offset without collision bias; and one of: for a case it is determined that the outer-loop link adaptation offset of the communication is using an offset without collision bias, then the updating comprises updating the outer-loop link adaptation offset of the communication with an offset without collision bias, else not updating the outer-loop link adaptation offset.

In accordance with the example embodiments of the invention as described in the paragraphs above, the updating of an outer-loop link adaptation offset is done based on the same offset being already used in link adaptation for the scheduled transmission tune interval for the network device.

In accordance with the example embodiments of the invention as described in the paragraphs above, for a case that the occurrence of collisions is below the sensing threshold; there is selection of an outer-loop link adaptation offset for link adaptation of a next transmission time interval comprising selecting the outer-loop link adaptation offset of a next transmission time interval of the communication with an offset without a collision bias, or else selecting the outer-loop link adaptation offset of the communication with an offset with a collision bias.

In accordance with the example embodiments of the invention as described in the paragraphs above, for a case that the occurrence of collisions is above the sensing threshold and channel state information for a transmission time interval of the communication is available, the determining comprises determining if the channel state information indicates a collision in the transmission time interval; and for a case the channel state information indicates a collision, there is selection of an outer-loop link adaptation offset for link adaptation of a next transmission time interval, comprising selecting the outer-loop link adaptation offset of the communication with an offset without a collision bias, or else selecting the outer-loop link adaptation offset of the communication with an offset with a collision bias.

In accordance with the example embodiments of the invention as described in the paragraphs above, for a case that the occurrence of collisions is below the sensing threshold; there is selection of an outer-loop link adaptation offset for link adaptation of a next transmission time interval comprising selecting the outer-loop link adaptation offset of the communication with an offset without a collision bias.

In accordance with the example embodiments of the invention as described in the paragraphs above, the acknowledgements comprise at least one of an ACK and a NACK.

Further, in accordance with an example embodiments of the invention as described above there is an apparatus comprising: means for determining [DP 224 and/or DP 244 of FIG. 3], by a network node, an occurrence of collisions in a communication associated with a network device [UE 10 of FIG. 3] of the communication network, where the determining is using a sensing threshold; and means, based on the determined occurrence of collisions, for updating an outer-loop link adaptation offset of the communication [transceiver 222 and wireless link 232 of FIG. 3].

In the example aspect of the invention according to the paragraph above, wherein the means for determining and updating comprises a memory [MEM 216, 226, and/or 246] encoded with a computer program [PROG 218, 228, and/or 248]; and/or executable by at least one processor [DP 215, 225, and 244].

The apparatus may be, include or be associated with at least one software application, module, unit or entity configured as arithmetic operation, or as a computer program or portions thereof (including an added or updated software routine), executed by at least one operation processor, unit or module. Computer programs, also called program products or simply programs, including software routines, applets and/or macros, may be stored in any apparatus-readable data storage medium. A computer program product may comprise one or more computer-executable components which; when the program is run, are configured to carry out embodiments described above by means of FIG. 3. Additionally, software routines may be downloaded into the apparatus.

The apparatus, such as a node or user device, or a corresponding component, may be configured as a computer or a microprocessor, such as single-chip computer element, or as a chipset, including or being coupled to a memory for providing storage capacity used for software or arithmetic operation(s) and at least one operation processor for executing the software or arithmetic operation(s).

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
    determining, by a network node, an occurrence level of collisions in a communication associated with a network device of a communication network, where the determining is using a sensing threshold; and
    based on the determined occurrence level of collisions, updating one of an outer-loop link adaptation offset with a collision bias and an outer-loop link adaptation offset without a collision bias; and
    using the updated outer-loop link adaptation offset for the communication, wherein the determining the occurrence level of collisions is based on a comparing the sensing threshold to information regarding an interference measurement; and wherein
    for a case that it is determined that the occurrence level of collisions exceeds the sensing threshold during a transmission time interval of the communication, the outer-loop link adaptation offset with the collision bias is updated and is used for the communication, or for a case it is determined that the occurrence level of collisions is below the sensing threshold during a transmission time interval of the communication, the outer-loop link adaptation offset without the collision bias is updated and is used for the communication.

2. The method of claim 1, wherein the determining the occurrence level of collisions is further based on comparing the sensing threshold to information regarding at least one of an error rate determined based on acknowledgements or a lack thereof from the network device, a hybrid automatic repeat request, and a received indication from the network device, wherein the received indication comprises at least one of channel state information and a channel quality indicator from the network device.

3. The method of claim 2, wherein the determining comprises:
    storing in a buffer information regarding the at least one of an interference measurement, an error rate of a received acknowledgement from the network device, a hybrid automatic repeat request, and a received indication; and
    comparing the buffered information to the sensing threshold, wherein the comparing is using the buffer information corresponding to a transmission time interval associated with the at least one of an interference measurement, the error rate of the received acknowledgement from the network device, and the received indication.

4. The method of claim 3, wherein the outer-loop link adaptation offset for the updating is selected from a look up table of at least two offsets stored in the network node, wherein the look-up table comprises information on a last used outer-loop link adaptation offset by the network device for each hybrid automatic repeat request process utilized by the network device.

5. The method of claim 2, wherein for a case it is determined that the outer-loop link adaptation offset of the communication is using an offset without collision bias, then the updating comprises updating the outer-loop link adaptation offset of the communication with an offset without collision bias,
    else not updating the outer-loop link adaptation offset.

6. The method of claim 2, wherein the updating of an outer-loop link adaptation offset is done on an outer-loop link adaptation offset being already used in link adaptation for a scheduled transmission time interval for the network device.

7. The method of claim 2, wherein the acknowledgements comprise at least one of an ACK and a NACK.

8. A non-transitory computer readable medium encoded with a computer program executed by a processor to perform actions comprising:
    determining, with a network node, an occurrence level of collisions in a communication associated with a network device of a communication network, where the determining is using a sensing threshold;
    based on the determined occurrence of collisions using the sensing threshold, updating one of an outer-loop link adaptation offset with a collision bias and an outer-loop link adaptation offset without a collision bias; and
    using the updated outer-loop link adaptation offset for the communication, wherein the determining the occurrence level of collisions is based on a comparing the sensing threshold to information regarding an interference measurement; and wherein
    for a case that it is determined that the occurrence level of collisions exceeds the sensing threshold during a transmission time interval of the communication, the outer-loop link adaptation offset with the collision bias is updated and is used for the communication, or
    for a case it is determined that the occurrence level of collisions is below the sensing threshold during a transmission time interval of the communication, the outer-loop link adaptation offset without the collision bias is updated and is used for the communication.

9. The non-transitory computer readable medium of claim 8, wherein the determining the occurrence level of collisions is further based on at least one of an error rate determined based on acknowledgements or a lack thereof from the network device, a hybrid automatic repeat request, and a received indication from the network device, wherein the received indication comprises at least one of channel state information and a channel quality indicator from the network device.

10. The non-transitory computer readable medium of claim 9, wherein the determining comprises:
    storing in a buffer information regarding the at least one of an interference measurement, an error rate of a received acknowledgement from the network device, a hybrid automatic repeat request, and a received indication; and
    comparing the buffered information to the sensing threshold, wherein the comparing is using the buffer information corresponding to a transmission time interval associated with the at least one of an interference measurement, the error rate of the received acknowledgement from the network device, and the received indication.

11. The non-transitory computer readable medium of claim 10, wherein the outer-loop link adaptation offset for the updating is selected from a look up table of at least two offsets stored in the network node, wherein the look-up table comprises information on a last used outer-loop link adaptation offset by the network device for each hybrid automatic repeat request received from the network device.

12. An apparatus comprising:
    at least one processor; and
    at least one memory including computer program code, where the at least one memory and the computer program code are configured, with the at least one processor, to cause the apparatus to at least:
    determine an occurrence level of collisions in a communication associated with a network device of a communication network, where the determining is using a sensing threshold; and
    based on the determined occurrence level of collisions, update one of an outer-loop link adaptation offset with a collision bias and an outer-loop link adaptation offset without a collision bias; and
    using the updated outer-loop link adaptation offset for the communication, wherein the determining the occurrence level of collisions is based on a comparing the sensing threshold to information regarding an interference measurement; and wherein
    for a case that it is determined that the occurrence level of collisions exceeds the sensing threshold during a transmission time interval of the communication, the outer-loop link adaptation offset with the collision bias is updated and is used for the communication, or
    for a case it is determined that the occurrence level of collisions is below the sensing threshold during a transmission time interval of the communication, the outer-loop link adaptation offset without the collision bias is updated and is used for the communication.

13. The apparatus of claim 12, wherein the determining the occurrence level of collisions is further based on at least one of an error rate determined based on acknowledgements or a lack thereof from the network device, a hybrid automatic repeat request, and a received indication from the network device, wherein the received indication comprises at least one of channel state information and a channel quality indicator from the network device.

14. The apparatus of claim 13, wherein the determining comprises:
storing in a buffer information regarding the at least one of an interference measurement, an error rate of a received acknowledgement from the network device, a hybrid automatic repeat request, and a received indication; and
comparing the buffered information to the sensing threshold, wherein the comparing is using the buffer information corresponding to a transmission time interval associated with the at least one of an interference measurement, the error rate of the received acknowledgement from the network device, and the received indication.

15. The apparatus of claim 14, wherein the outer-loop link adaptation offset for the updating is selected from a look up table of at least two offsets stored in the network node, wherein the look-up table comprises information on a last used outer-loop link adaptation offset by the network device for each hybrid automatic repeat request received from the network device.

16. The apparatus of claim 13, wherein for a case that it is determined that there is not an occurrence of collisions during a transmission time interval of the communication, the updating the outer-loop link adaptation offset of the communication comprises:
determining if the outer-loop link adaptation offset of the communication is using an offset without collision bias; and one of:
for a case it is determined that the outer-loop link adaptation offset of the communication is using an offset without collision bias, then the updating comprises updating the outer-loop link adaptation offset of the communication with an offset without collision bias,
else not updating the outer-loop link adaptation offset.

17. The apparatus of claim 13, wherein the updating of an outer-loop link adaptation offset is done based on the same offset being already used in link adaptation for the scheduled transmission time interval for the network device.

18. The apparatus of claim 12, wherein the communication network comprises a license assisted access communication network for the network device, wherein the license assisted access network is using a long term evolution carrier, and wherein the network node is a license assisted access network node.

* * * * *